United States Patent
Muff et al.

(10) Patent No.: US 8,102,884 B2
(45) Date of Patent: Jan. 24, 2012

(54) DIRECT INTER-THREAD COMMUNICATION BUFFER THAT SUPPORTS SOFTWARE CONTROLLED ARBITRARY VECTOR OPERAND SELECTION IN A DENSELY THREADED NETWORK ON A CHIP

(75) Inventors: Adam J. Muff, Rochester, MN (US); Robert A. Shearer, Rochester, MN (US); Matthew R. Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 12/251,528

(22) Filed: Oct. 15, 2008

(65) Prior Publication Data
US 2010/0091787 A1    Apr. 15, 2010

(51) Int. Cl.
*H04J 3/04*    (2006.01)
(52) U.S. Cl. ........................................... 370/535
(58) Field of Classification Search .................. 370/535, 370/419, 400; 712/228, 214; 345/557, 531, 345/505, 501, 502, 506, 530, 554, 559
See application file for complete search history.

(56) References Cited

U.S. PATENT DOCUMENTS

| | | | | |
|---|---|---|---|---|
| 5,835,764 A | * | 11/1998 | Platt et al. | 718/101 |
| 6,058,465 A | * | 5/2000 | Nguyen | 712/7 |
| 2003/0061457 A1 | * | 3/2003 | Geiger et al. | 711/165 |

* cited by examiner

*Primary Examiner* — Man Phan
*Assistant Examiner* — Nourali Mansoury
(74) *Attorney, Agent, or Firm* — Jim Boice

(57) ABSTRACT

A computer-implemented method, system and computer program product for retrieving arbitrarily aligned vector operands within a highly threaded Network On a Chip (NOC) processor are presented. Multiple nodes in a NOC are able to access a single Compressed Direct Interthread Communication Buffer (CDICB), which contains a misaligned but compacted set of operands. Using information from a Special Purpose Register (SPR) within the NOC, each node is able to selectively extract one or more operands from the CDICB for use in an execution unit within that node. Output from the execution unit is then sent to the CDICB to update the compacted set of operands.

20 Claims, 11 Drawing Sheets

DIRECT INTER-THREAD COMMUNICATION BUFFER THAT SUPPORTS SOFTWARE CONTROLLED ARBITRARY VECTOR OPERAND SELECTION IN A DENSELY THREADED NETWORK ON A CHIP

TECHNICAL FIELD

The present disclosure relates to the field of computers, and specifically to threaded computers. Still more particularly, the present disclosure relates to Network On a Chip (NOC) integrated circuit processors.

DESCRIPTION OF THE RELATED ART

A Network On A Chip (NOC) is a novel integrated circuit that applies a network architecture to a single chip to create a unique processing unit. Rather than utilizing a standard single von Neumann architecture, which has a control unit that coordinates data flowing between an arithmetic logic unit and memory, and between the arithmetic logic unit and input/output buffers along system and Input/Output (I/O) buses, a NOC passes data between logic nodes (each of which may utilize a von Neumann-type processor) using packets. Each packet includes a header, which addresses the logic node that is to receive and process the packet, and a payload (e.g., data, instructions, etc.). However, oftentimes the data within the packet is unaligned, or misaligned, with reference to data loading protocol requirements of the logic nodes.

SUMMARY OF THE INVENTION

A computer-implemented method, system and computer program product for retrieving arbitrarily aligned vector operands within a highly threaded Network On a Chip (NOC) processor are presented. Multiple nodes in a NOC are able to access a single Compressed Direct Interthread Communication Buffer (CDICB), which contains a misaligned but compacted set of operands. Using information from a Special Purpose Register (SPR) within the NOC, each node is able to selectively extract one or more operands from the CDICB for use in an execution unit within that node. Output from the execution unit is then sent to the CDICB to update the compacted set of operands.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
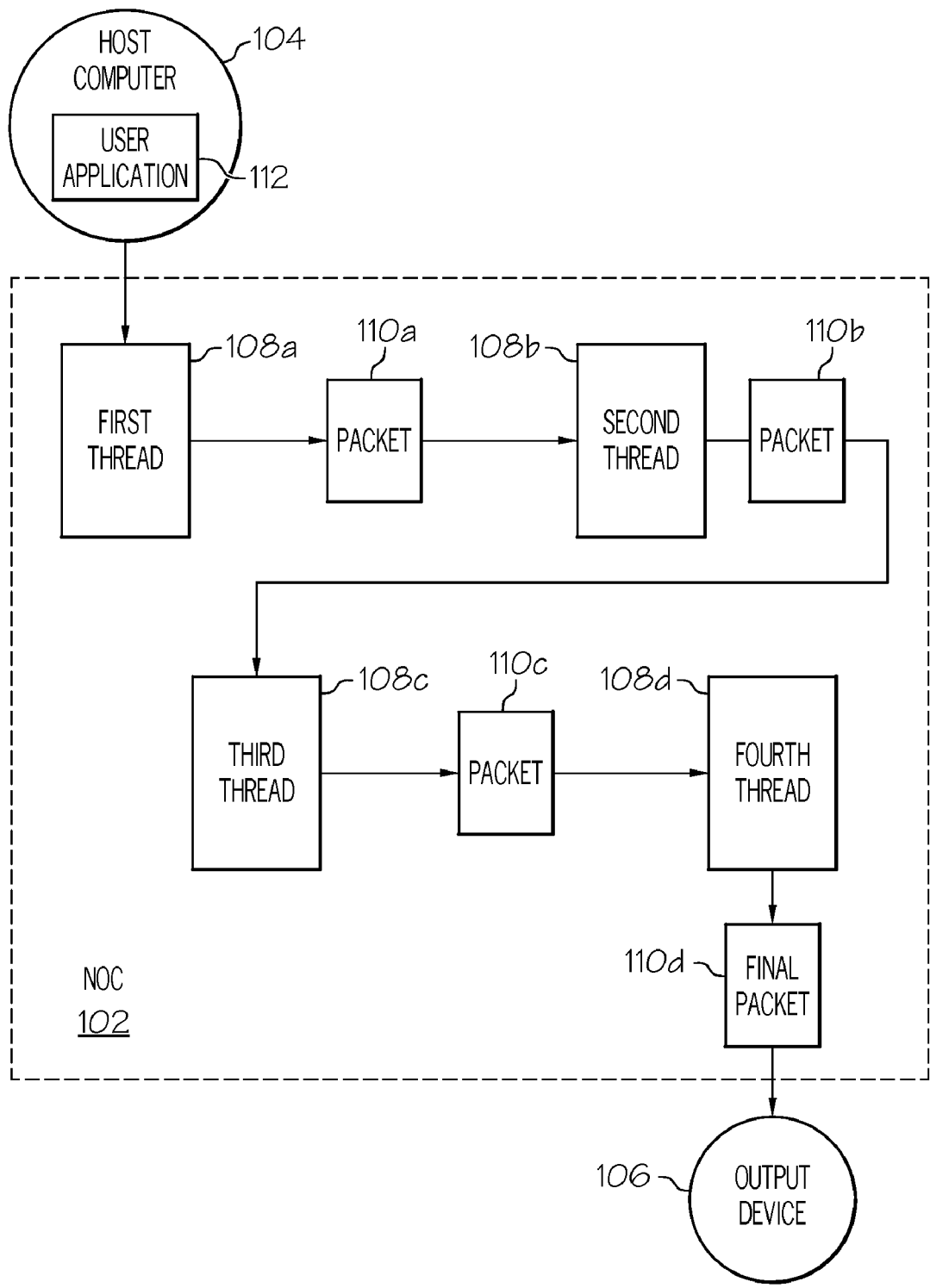
FIG. 1 depicts an exemplary Network On a Chip (NOC) that has multiple threads.

Certain software applications utilize a Network On a Chip (NOC) in a manner that allocates different nodes within the NOC to different parts of a job. For example, consider the NOC 102 depicted in FIG. 1. NOC 102 receives executable software instructions from a user application 112 in host computer 104, processes those instructions, and then outputs execution results to an output device 106 (e.g., a monitor, a printer, a storage device, etc.). In an example described in FIG. 1, there are four hardware threads 108a-d within NOC 102, each of which performs a different portion of a job described by user application 112. Each of the threads 108a-d is comprised of a hardware processor logic, and may also be associated with a specialized set of software for performing a particular sub-task for the overall job performed by user application 112. Thus, thread 108a may handle a first part of the overall job, resulting in a first output that is placed into a packet 110a and sent to the second thread 108b. The second thread then processes the data from packet 110a, resulting in a second output that is packeted into packet 110b and sent to the third thread 108c. The third thread processes the data from packet 110b, resulting in a third output that is packeted into packet 110c and sent to the fourth thread 108d, which processes the data from packet 110d. Fourth thread 108d then completes the final operation required for the overall job by generating a final output packet 110d that is sent to the output device 106.

Figure 2:
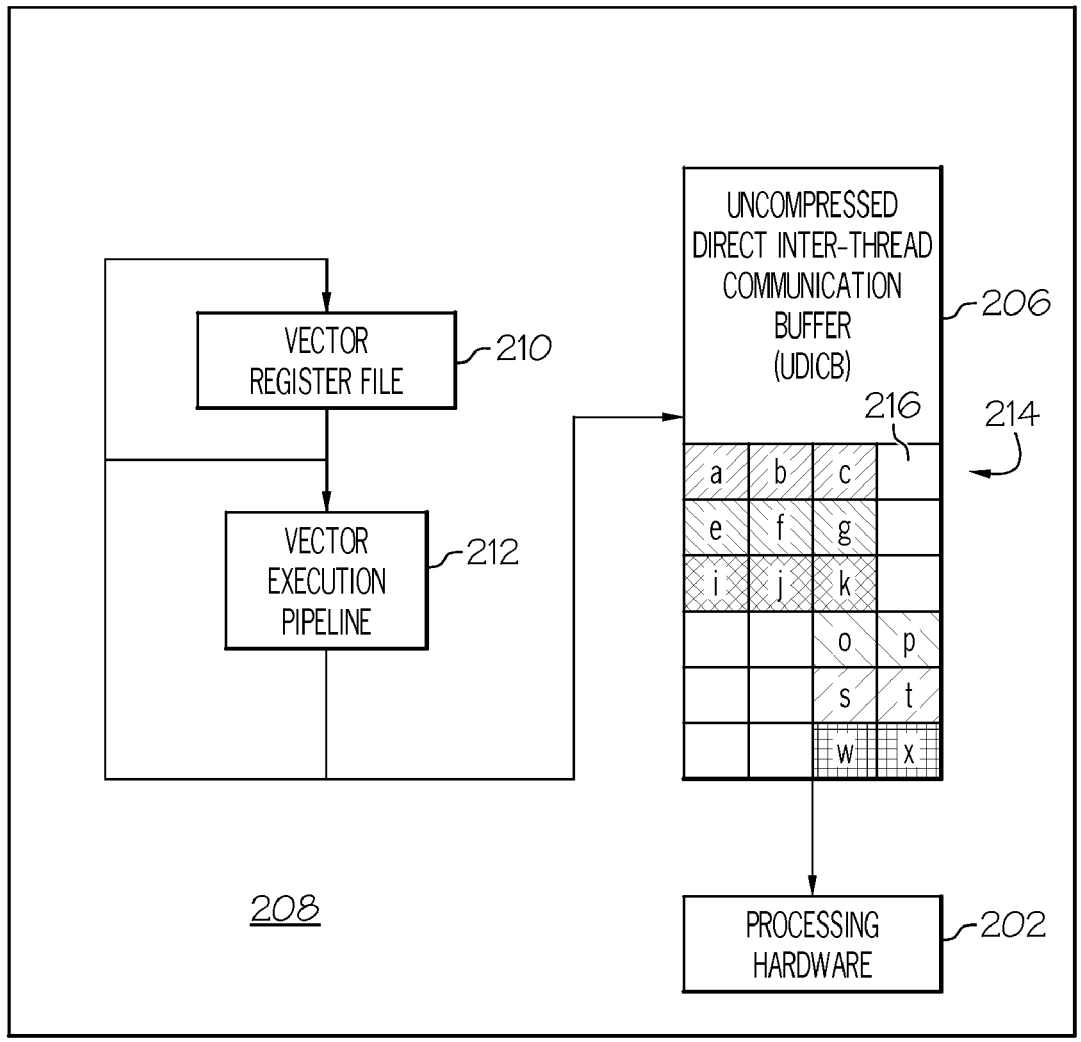
FIG. 2 illustrates unaligned data stored in an Uncompressed Direct Inter-thread Communication buffer.

Additional detail of an exemplary one of the threads 108a-d is presented in FIG. 2 as thread 208. Within thread 208 is a processing hardware 202, which may be a processor, an Application Specific Integrated Circuit (ASIC), etc. for processing data from an Uncompressed Direct Inter-thread Communication Buffer (UDICB) 206. As described below, UDICB 206 contains data, such as operands that are used in calculations performed by processing hardware 202. This data may be accessed by multiple threads (processing nodes) within a NOC. Within each thread 208 is a vector register file 210 and a vector execution pipeline data retrieval logic 212 that causes each row of data words (i.e., data word aggregations) to be loaded together as one unit into the processing hardware 202 for execution. Note the following issue in FIG. 2. Each row of data from the packet buffer 206 is loaded into the processing hardware 202 as a single aggregation that is of a fixed size, regardless of what data is or is not in a row. That is, as shown in the example depicted in FIG. 2, the processing hardware 202 loads an entire four-word line whenever a load command is executed, regardless of how many words are actually in a row. Thus, since the aggregations (rows) of data words are of different sizes, there are "holes" in the UDICB 206. That is, row 214 stores a data aggregation that includes data words "a,b,c" as a three-word aggregation, which has no "d" word. Thus, there is an empty block 216 in row 214 of the UDICB 206. Other rows of data stored within the UDICB 206 likewise have empty block cells due to data aggregations (entire rows) having less than four words. Transmitting and "buffering" non-existent words reduces overall efficiency within a system, particularly a NOC, since transmission traffic is inflated (with null data) and packet buffers used to transmit data from the UDICB must be designed to be large enough to reserve space for such non-existent data.

Figure 3:
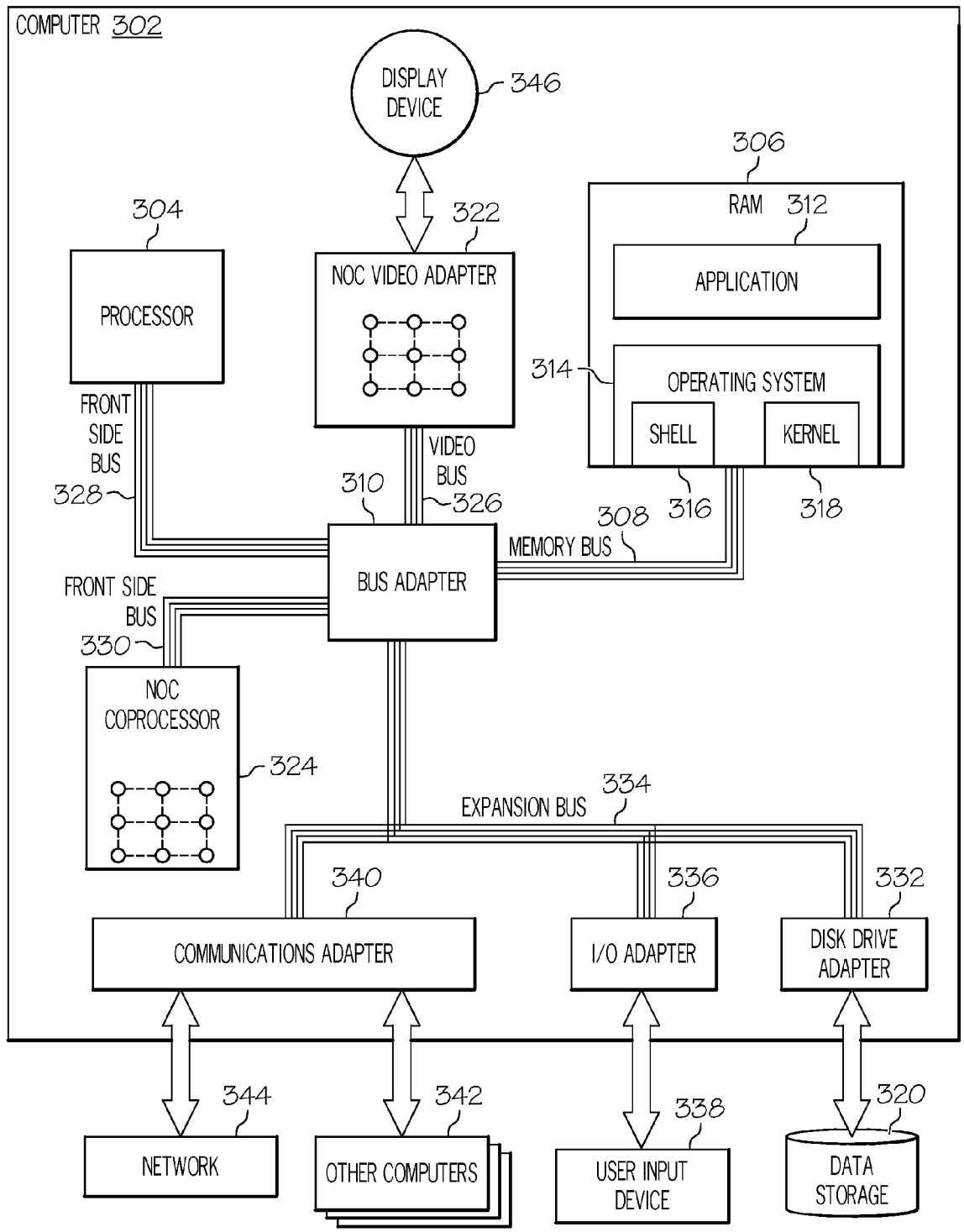
FIG. 3 depicts an exemplary embodiment of a computer that utilizes one or more NOCs in accordance with one embodiment of the present invention.

Before examining how the issue presented in FIG. 2 is addressed by the present invention, consider an exemplary computer 302, depicted in FIG. 3, which utilizes one or more NOCs in accordance with the present invention. As depicted, FIG. 3 sets forth a block diagram of exemplary computer 302, which includes at least one computer processor 304. Computer processor 304 may be a standard von-Neumann type of processor or a NOC. Computer 302 also includes a Random Access Memory (RAM) 306, which is system memory that is coupled through a high speed memory bus 308 and bus adapter 310 to processor 304 and to other components of the computer 302.

Stored in RAM 306 is an application program 312, a module of computer program instructions for carrying out particular data processing tasks such as, for example, word processing, spreadsheets, database operations, video gaming, stock market simulations, atomic quantum process simulations, or other user-level applications. Application program 312 also includes control processes, such as those described above in FIGS. 1-2 and below in FIGS. 8-11. Also stored in RAM 306 is an Operating System (OS) 314. OS 314 includes a shell 316, for providing transparent user access to resources such as application programs 312. Generally, shell 316 is a program that provides an interpreter and an interface between the user and the operating system. More specifically, shell 316 executes commands that are entered into a command line user interface or from a file. Thus, shell 316, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 318) for processing. Note that while shell 316 is a text-based, line-oriented user interface, the present invention will equally well support other user interface modes, such as graphical, voice, gestural, etc.

As depicted, OS 314 also includes kernel 318, which includes lower levels of functionality for OS 314, including providing essential services required by other parts of OS 314 and application programs (e.g., application 312), including memory management, process and task management, disk management, and mouse and keyboard management.

Although operating system 314 and the application 312 in the example of FIG. 3 are shown in RAM 306, such software components may also be stored in non-volatile memory, such as on a disk drive as data storage 320.

The example computer 302 includes two example NOCs according to embodiments of the present invention: a NOC video adapter 322 and a NOC coprocessor 324. The NOC video adapter 322 is an example of an I/O adapter specially designed for graphic output to a display device 346 such as a display screen or computer monitor. NOC video adapter 322 is connected to processor 304 through a high speed video bus 326, bus adapter 310, and the front side bus 328, which is also a high speed bus.

The example NOC coprocessor 324 is connected to processor 304 through bus adapter 310, and front side bus 328 and front side bus 330, which is also a high speed bus. The NOC coprocessor 324 is optimized to accelerate particular data processing tasks at the behest of the main processor 304.

The example NOC video adapter 322 and NOC coprocessor 324 each include a NOC according to embodiments of the present invention, including Integrated Processor ("IP") blocks, routers, memory communications controllers, and network interface controllers, with each IP block being adapted to a router through a memory communications controller and a network interface controller, each memory communications controller controlling communication between an IP block and memory, and each network interface controller controlling inter-IP block communications through routers. The NOC video adapter 322 and the NOC coprocessor 324 are optimized for programs that use parallel processing and also require fast random access to shared memory. In one embodiment, however, the NOCs described herein and contemplated for use by the present invention utilize only packet data, rather than direct access to shared memory. Again, note that additional details of exemplary NOC architecture as contemplated for use by the present invention are presented below in FIGS. 4-10.

Continuing with FIG. 3, computer 302 may include a disk drive adapter 332 coupled through an expansion bus 334 and bus adapter 310 to processor 304 and other components of computer 302. Disk drive adapter 332 connects non-volatile data storage to the computer 302 in the form of the disk drive represented as data storage 320. Disk drive adapters useful in computers for data processing with a NOC according to embodiments of the present invention include Integrated Drive Electronics ("IDE") adapters, Small Computer System Interface ("SCSI") adapters, and others as will occur to those of skill in the art. Non-volatile computer memory also may be implemented, such as an optical disk drive, Electrically Erasable Programmable Read-Only Memory (so-called "EEPROM" or "Flash" memory), and so on, as will occur to those of skill in the art.

The example computer 302 also includes one or more input/output ("I/O") adapters 336. I/O adapter(s) 336 implement user-oriented input/output through, for example, software drivers and computer hardware for controlling output to display devices such as computer display screens, as well as user input from user input devices 338, such as keyboards and mice.

The exemplary computer 302 may also include a communications adapter 340 for data communications with other computers 342, and for data communications with a data communications network 344. Such data communications may be carried out serially through RS-232 connections, through external buses such as a Universal Serial Bus ("USB"), through data communications networks such as IP data communications networks, and in other ways as will occur to those of skill in the art. Communications adapters implement the hardware level of data communications through which one computer sends data communications to another computer, directly or through a data communications network. Examples of communications adapters useful for data processing with a NOC according to embodiments of the present invention include modems for wired dial-up communications, Ethernet (IEEE 802.3) adapters for wired data communications network communications, and IEEE 802.x adapters for wireless data communications network communications.

Note that while NOC video adapter 322 and NOC coprocessor 324 are but two exemplary uses of a NOC, the NOCs and control of work packets described herein may be found in any context in which a NOC is useful for data processing.

Figure 4:
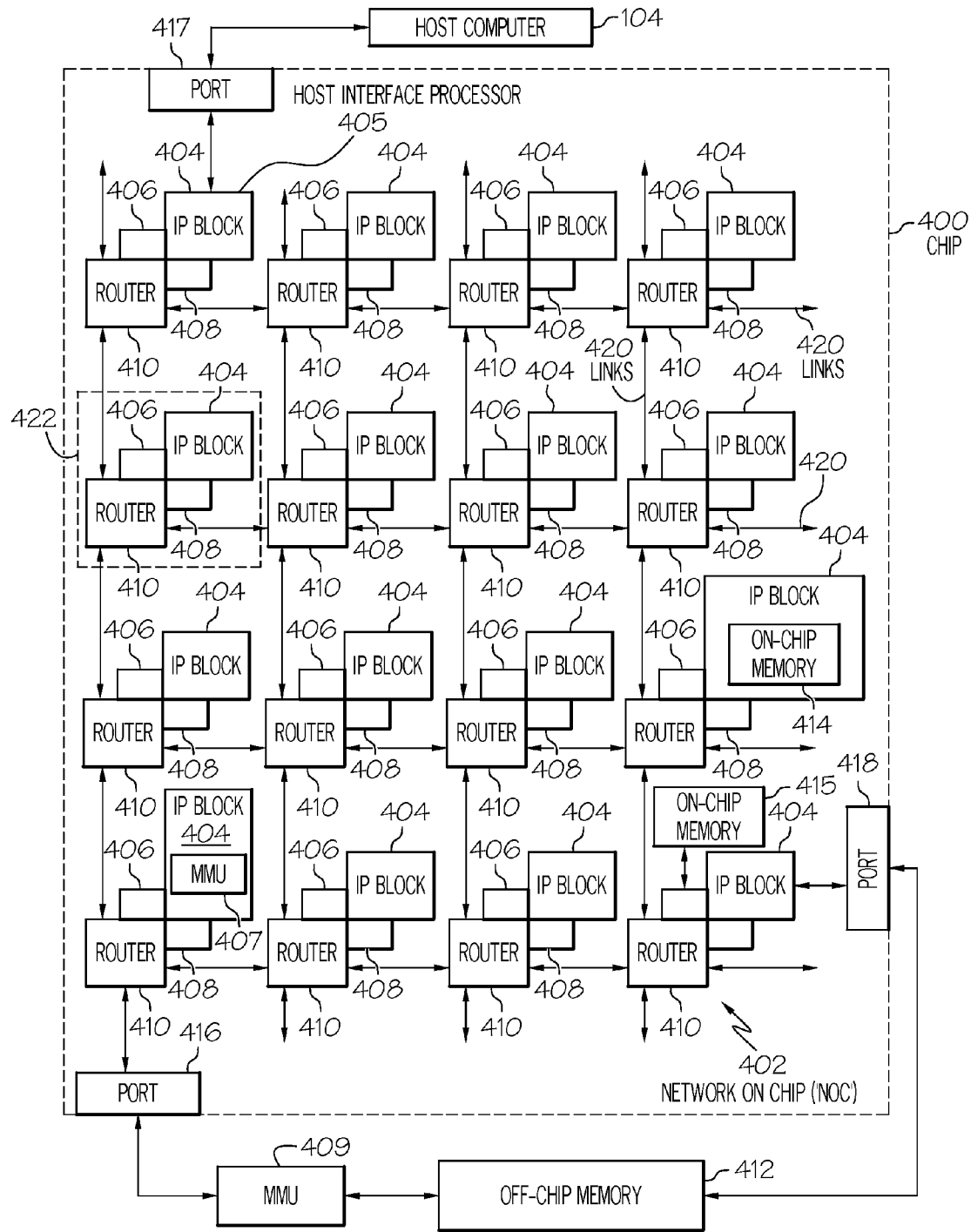
FIG. 4 illustrates additional detail of the one or more NOCs depicted in FIG. 3.

With reference now to FIG. 4, a functional block diagram is presented of an exemplary NOC 402 according to embodiments of the present invention. NOC 402 is an exemplary NOC that may be utilized as NOC video adapter 322 and/or NOC coprocessor 324 shown in FIG. 3. NOC 402 is implemented on an integrated circuit chip 400, and is controlled by a host computer 104 (e.g., processor 304 shown in FIG. 3). The NOC 402 includes Integrated Processor ("IP") blocks 404, routers 410, memory communications controllers 406, and network interface controllers 408. Each IP block 404 is adapted to a router 410 through a dedicated memory communications controller 406 and a dedicated network interface controller 408. Each memory communications controller 406 controls communications between an IP block 404 and memory (e.g., an on-chip memory 414 and/or an off-chip memory 412), and each network interface controller 408 controls inter-IP block communications through routers 410.

In NOC 402, each IP block 404 represents a reusable unit of synchronous or asynchronous logic design used as a building block for data processing within the NOC 402. The term "IP block" is sometimes referred to as an "intellectual property block," thus designating an IP block 404 as a design that is owned by a party, which is the intellectual property of a party, to be licensed to other users or designers of semiconductor circuits. In the scope of the present invention, however, there is no requirement that IP blocks be subject to any particular ownership, so the term is always expanded in this specification as "integrated processor block." Thus, IP blocks 404, as specified here, are reusable units of logic, cell, or chip layout design that may or may not be the subject of intellectual property. Furthermore, IP blocks 404 are logic cores that can be formed as Application Specific Integrated Circuit (ASIC) chip designs or Field Programmable Gate Array (FPGA) logic designs.

One way to describe IP blocks by analogy is that IP blocks are for NOC design what a library is for computer programming or a discrete integrated circuit component is for printed circuit board design. In NOCs according to embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHSIC Hardware Description Language (VHDL). In addition to netlist and synthesizable implementation, NOCs may also be delivered in lower-level, physical descriptions. Analog IP block elements such as a Serializer/Deserializer (SERDES), Phase-Locked Loop (PLL), Digital-to-Analog Converter (DAC), Analog-to-Digital Converter (ADC), and so on, may be distributed in a transistor-layout format such as Graphic Data System II (GDSII). Digital elements of IP blocks are sometimes offered in layout format as well.

Each IP block 404 shown in FIG. 4 is adapted to a router 410 through a memory communications controller 406. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 406 are described in more detail below in FIG. 5.

Each IP block 404 depicted in FIG. 4 is also adapted to a router 410 through a network interface controller 408. Each network interface controller 408 controls communications through routers 410 between IP blocks 404. Examples of communications between IP blocks include messages (e.g., message/data packets) carrying data and instructions for processing the data among IP blocks in parallel applications and in pipelined applications. The network interface controllers 408 are described in more detail below in FIG. 5.

The routers 410 and links 420 among the routers implement the network operations of the NOC 402 shown in FIG. 4. The links 420 are packet structures implemented on physical, parallel wire buses connecting all the routers. That is, each link is implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, thus requiring 512 wires. In addition, each link 420 is bi-directional, so that if the link packet structure includes 64 bytes, the wire bus actually contains 1024 wires between each router 410 and each of its neighbor routers 410 in the network. A message can include more than one packet, but each packet fits precisely onto the width of the wire bus. If the connection between the router and each section of wire bus is referred to as a port, then each router includes five ports, one for each of four directions of data transmission on the network and a fifth port for adapting the router to a particular IP block through a memory communications controller and a network interface controller.

As stated above, each memory communications controller 406 controls communications between an IP block and memory. Memory can include off-chip main RAM 412, an on-chip memory 415 that is connected directly to an IP block through a memory communications controller 406, on-chip memory enabled as an IP block 414, and on-chip caches. In the NOC 402 shown in FIG. 4, either of the on-chip memories (414, 415), for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. On-chip memory 414 on an IP block can be addressed from that IP block or from any other IP block in the NOC. On-chip memory 415 is attached directly to a memory communication controller, and can be addressed by the IP block that is adapted to the network by that memory communication controller. Note that on-chip memory 415 can also be addressed from any other IP block 404 anywhere in the NOC 402.

Exemplary NOC 402 includes two Memory Management Units ("MMUs") 407 and 409, illustrating two alternative memory architectures for NOCs according to embodiments of the present invention. MMU 407 is implemented with a specific IP block 404, allowing a processor within that IP block 404 to operate in virtual memory while allowing the entire remaining architecture of the NOC 402 to operate in a physical memory address space. The MMU 409 is implemented off-chip, connected to the NOC through a data communications port referenced as port 416. Port 416 includes the pins and other interconnections required to conduct signals between the NOC 402 and the MMU 409, as well as sufficient intelligence to convert message packets from the NOC packet format to the bus format required by the external MMU 409. The external location of the MMU 409 means that all processors in all IP blocks 404 of the NOC 402 can operate in virtual memory address space, with all conversions to physical addresses of the off-chip memory handled by the off-chip MMU 409.

In addition to the two memory architectures illustrated by use of the MMUs 407 and 409, the data communications port depicted as port 418 illustrates a third memory architecture useful in NOCs according to embodiments of the present invention. Port 418 provides a direct connection between an IP block 404 of the NOC 402 and off-chip memory 412. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 418. The port 418 includes the pins and other interconnections required to conduct signals between the NOC and the off-chip memory 412, as well as sufficient intelligence to convert message packets from the NOC packet format to the bus format required by the off-chip memory 412.

In the exemplary NOC 402 shown in FIG. 4, one of the IP blocks 404 is designated a host interface processor 405. A host interface processor 405 provides an interface between the NOC 402 and a host computer 104 (introduced in FIG. 1). Host interface processor 405 provides data processing services to the other IP blocks on the NOC, including, for example, receiving and dispatching among the IP blocks of the NOC data processing requests from the host computer.

Host interface processor 405 is connected to the larger host computer 104 (originally depicted in FIG. 1) through a data communications port such as port 417. Port 417 includes the pins and other interconnections required to conduct signals between the NOC 402 and the host computer 104, as well as sufficient intelligence to convert message packets from the NOC 402 to the bus format required by the host computer 104. In the example of the NOC coprocessor 324 in the computer 302 shown in FIG. 3, such a port would provide data communications format translation between the link structure of the NOC coprocessor 324 and the protocol required for the front side bus 330 between the NOC coprocessor 324 and the bus adapter 310.

Note that each group of elements 404, 406, 408, and 410 can be viewed and referenced as a node 422 within the NOC 402.

Figure 5:
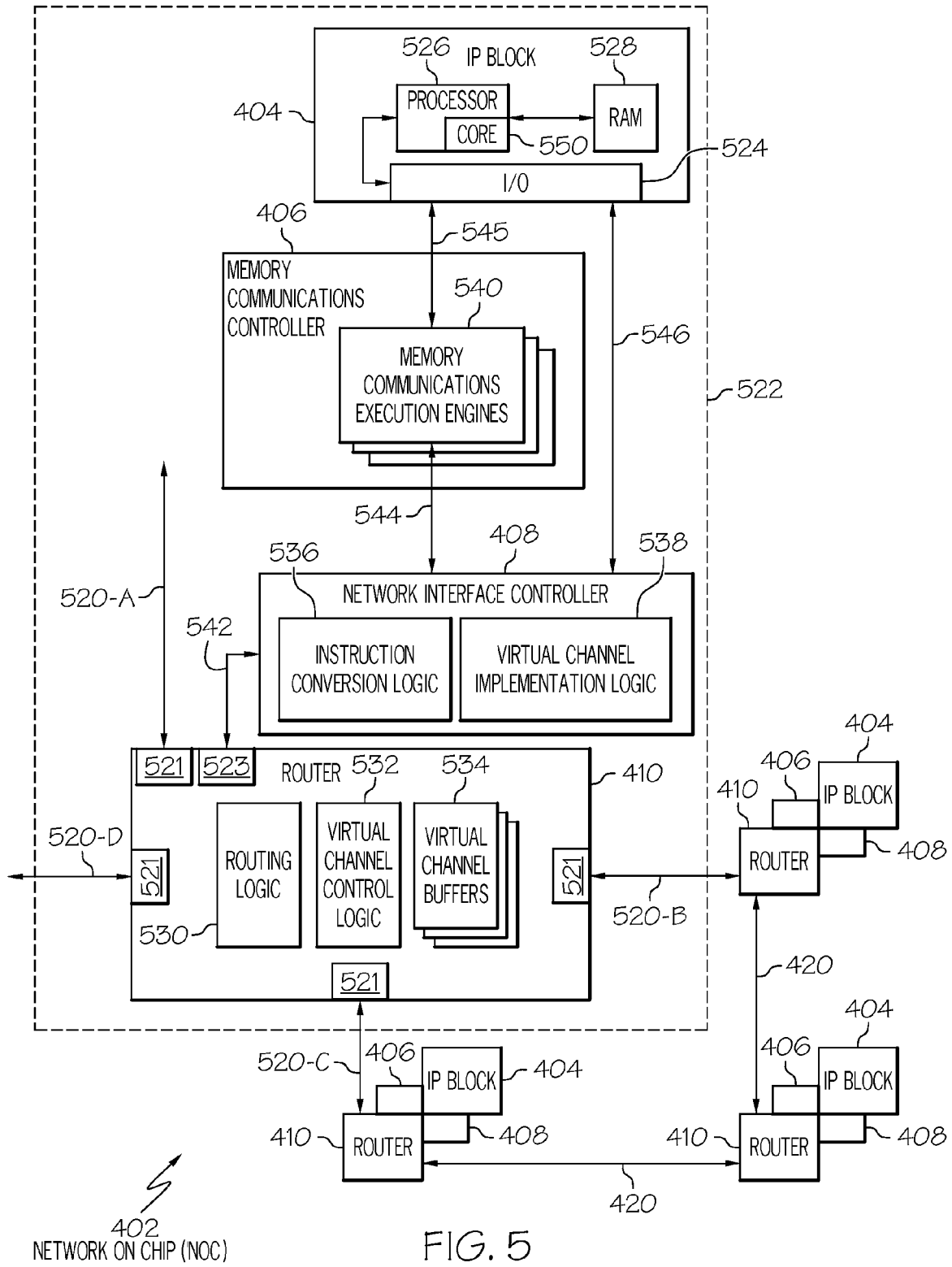
FIG. 5 depicts additional detail of a processor node from the NOC shown in FIG. 4.

Referring now to FIG. 5, additional detail of NOC 402 is presented according to embodiments of the present invention. As depicted in FIG. 4 and FIG. 5, NOC 402 is implemented on a chip (e.g., chip 400 shown in FIG. 4), and includes integrated processor ("IP") blocks 404, routers 410, memory communications controllers 406, and network interface controllers 408. Each IP block 404 is adapted to a router 410 through a memory communications controller 406 and a network interface controller 408. Each memory communications controller 406 controls communications between an IP block and memory, and each network interface controller 408 controls inter-IP block communications through routers 410. In the example of FIG. 5, one set 522 of an IP block 404 adapted to a router 410 through a memory communications controller 406 and network interface controller 408 is expanded to aid a more detailed explanation of their structure and operations. All the IP blocks, memory communications controllers, network interface controllers, and routers in the example of FIG. 5 are configured in the same manner as the expanded set 522.

In the example of FIG. 5, each IP block 404 includes a computer processor 526, which includes one or more cores 550, and I/O functionality 524. In this example, computer memory is represented by a segment of Random Access Memory ("RAM") 528 in each IP block 404. The memory, as described above with reference to the example of FIG. 4, can occupy segments of a physical address space whose contents on each IP block are addressable and accessible from any IP block in the NOC. The processors 526, I/O capabilities 524, and memory (RAM 528) on each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In the NOC 402 shown in FIG. 5, each memory communications controller 406 includes a plurality of memory communications execution engines 540. Each memory communications execution engine 540 is enabled to execute memory communications instructions from an IP block 404, including bidirectional memory communications instruction flow (544, 545, 546) between the network interface controller 408 and the IP block 404. The memory communications instructions executed by the memory communications controller may originate, not only from the IP block adapted to a router through a particular memory communications controller, but also from any IP block 404 anywhere in the NOC 402. That is, any IP block 404 in the NOC 402 can generate a memory communications instruction and transmit that memory communications instruction through the routers 410 of the NOC 402 to another memory communications controller associated with another IP block for execution of that memory communications instruction. Such memory communications instructions can include, for example, translation lookaside buffer control instructions, cache control instructions, barrier instructions, and memory load and store instructions.

Each of the depicted memory communications execution engines 540 is enabled to execute a complete memory communications instruction separately and in parallel with other memory communications execution engines 540. The memory communications execution engines 540 implement a scalable memory transaction processor optimized for concurrent throughput of memory communications instructions. The memory communications controller 406 supports multiple memory communications execution engines 540, all of which run concurrently for simultaneous execution of multiple memory communications instructions. A new memory communications instruction is allocated by the memory communications controller 406 to each memory communications execution engine 540, and the memory communications execution engines 540 can accept multiple response events simultaneously. In this example, all of the memory communications execution engines 540 are identical. Scaling the number of memory communications instructions that can be handled simultaneously by a memory communications controller 406, therefore, is implemented by scaling the number of memory communications execution engines 540.

In the NOC 402 depicted in FIG. 5, each network interface controller 408 is enabled to convert communications instructions from command format to network packet format for transmission among the IP blocks 404 through routers 410. The communications instructions are formulated in command format by the IP block 410 or by the memory communications controller 406 and provided to the network interface controller 408 in command format. The command format is a native format that conforms to architectural register files of the IP block 404 and the memory communications controller 406. The network packet format is the format required for transmission through routers 410 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In the NOC 402 shown in FIG. 5, each IP block 404 is enabled to send memory-address-based communications to and from memory through the IP block's memory communications controller and then also through its network interface controller to the network. A memory-address-based communications is a memory access instruction, such as a load instruction or a store instruction, which is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. All memory-address-based communication that are executed with message traffic are passed from the memory communications controller to an associated network interface controller for conversion (using instruction conversion logic 536) from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 406 is naturally also the network location of that memory communication controller's associated router 410, network interface controller 408, and IP block 404. The instruction conversion logic 536 within each network interface controller is capable of converting memory addresses to network addresses for purposes of transmitting memory-address-based communications through routers of a NOC.

Upon receiving message traffic from routers 410 of the network, each network interface controller 408 inspects each packet for memory instructions. Each packet containing a memory instruction is handed to the memory communications controller 406 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

Returning now to the NOC 402 as depicted in FIG. 5, each IP block 404 is enabled to bypass its memory communications controller 406 and send inter-IP block, network-addressed communications 546 directly to the network through the IP block's network interface controller 408. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through its I/O functions 524 directly to the IP block's network interface controller in command format, then converted to packet format by the network interface controller and transmitted through routers of the NOC to another IP block. Such network-addressed communications 546 are bidirectional, potentially proceeding to and from each IP block of the NOC, depending on their use in any particular application. Each network interface controller, however, is enabled to both send and receive (communication 542) such communications to and from an associated router, and each network interface controller is enabled to both send and receive (communication 546) such communications directly to and from an associated IP block, bypassing an associated memory communications controller 406.

Each network interface controller 408 in the example of FIG. 5 is also enabled to implement virtual channels on the network, characterizing network packets by type. Each network interface controller 408 includes virtual channel implementation logic 538 that classifies each communication instruction by type and records the type of instruction in a field of the network packet format before handing off the instruction in packet form to a router 410 for transmission on the NOC. Examples of communication instruction types include inter-IP block network-address-based messages, request messages, responses to request messages, invalidate messages directed to caches; memory load and store messages; and responses to memory load messages, and so on.

Each router 410 in the example of FIG. 5 includes routing logic 530, virtual channel control logic 532, and virtual channel buffers 534. The routing logic typically is implemented as a network of synchronous and asynchronous logic that implements a data communications protocol stack for data communication in the network formed by the routers 410, links 420, and bus wires among the routers. The routing logic 530 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed. Each router in this example includes five ports, four ports 521 connected through bus wires (520-A, 520-B, 520-C, 520-D) to other routers and a fifth port 523 connecting each router to its associated IP block 404 through a network interface controller 408 and a memory communications controller 406.

In describing memory-address-based communications above, each memory address was described as mapped by network interface controllers to a network address, a network location of a memory communications controller. The network location of a memory communication controller 406 is naturally also the network location of that memory communication controller's associated router 410, network interface controller 408, and IP block 404. In inter-IP block, or network-address-based communications, therefore, it is also typical for application-level data processing to view network addresses as the locations of IP blocks within the network formed by the routers, links, and bus wires of the NOC. Note that FIG. 4 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In the NOC 402 depicted in FIG. 5, each router 410 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 410 depicted in FIG. 5 also includes virtual channel control logic 532 and virtual channel buffers 534. The virtual channel control logic 532 examines each received packet for its assigned communications type and places each packet in an outgoing virtual channel buffer for that communications type for transmission through a port to a neighboring router on the NOC.

Each virtual channel buffer 534 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 534 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 408. Each network interface controller is configured to, upon receipt of such a signal, refuse to accept, from its associated memory communications controller 406 or from its associated IP block 404, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped in the architecture of FIG. 5. When a router encounters a situation in which a packet might be dropped in some unreliable protocol such as, for example, the Internet Protocol, the routers in the example of FIG. 5 suspend by their virtual channel buffers 534 and their virtual channel control logic 532 all transmissions of packets in a virtual channel until buffer space is again available, eliminating any need to drop packets. The NOC 402, as depicted in FIG. 5, therefore, implements highly reliable network communications protocols with an extremely thin layer of hardware.

Figure 6:
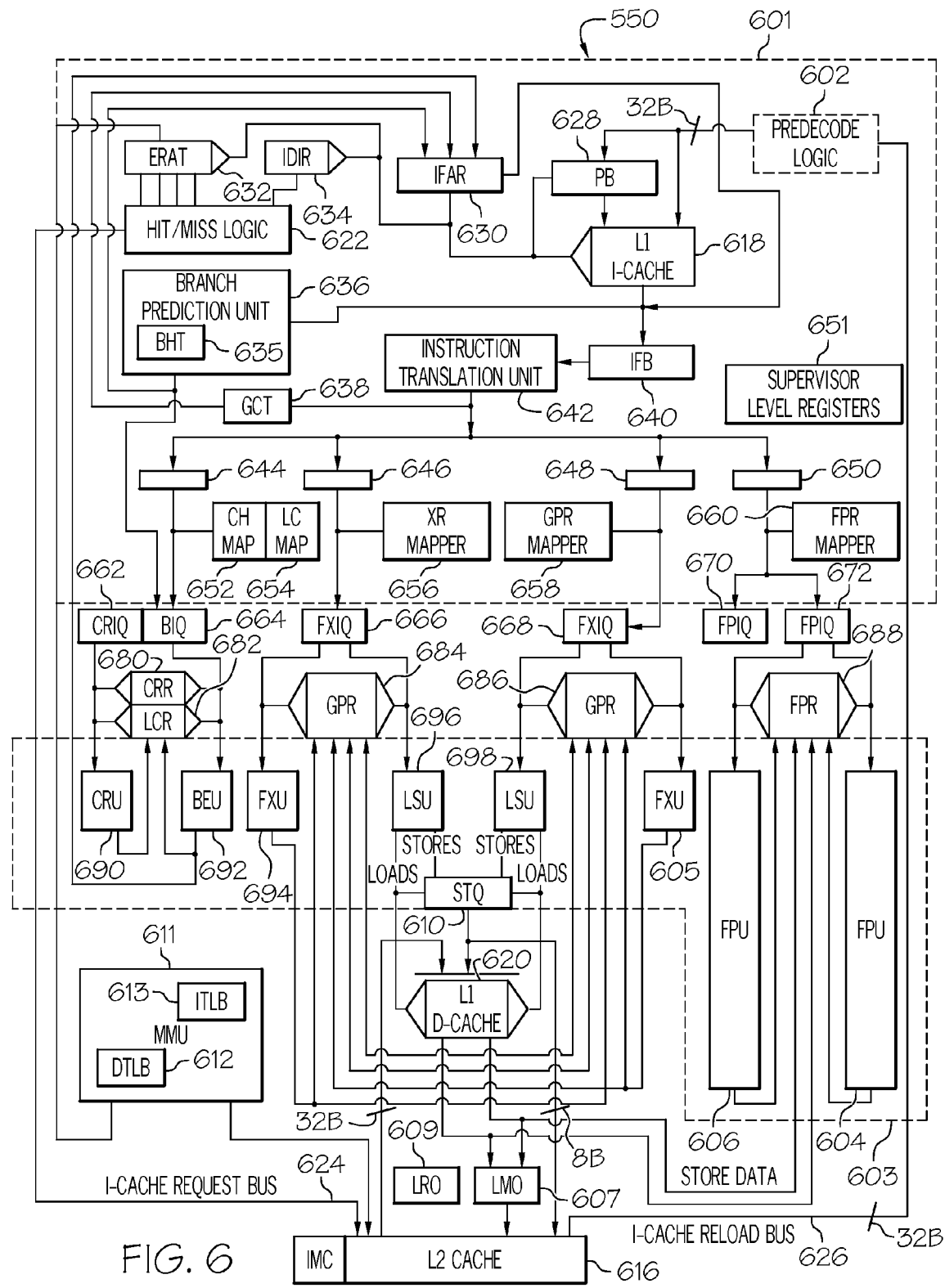
FIG. 6 illustrates additional detail of a processor core found in the processor node shown in FIG. 5.
Figure 7:
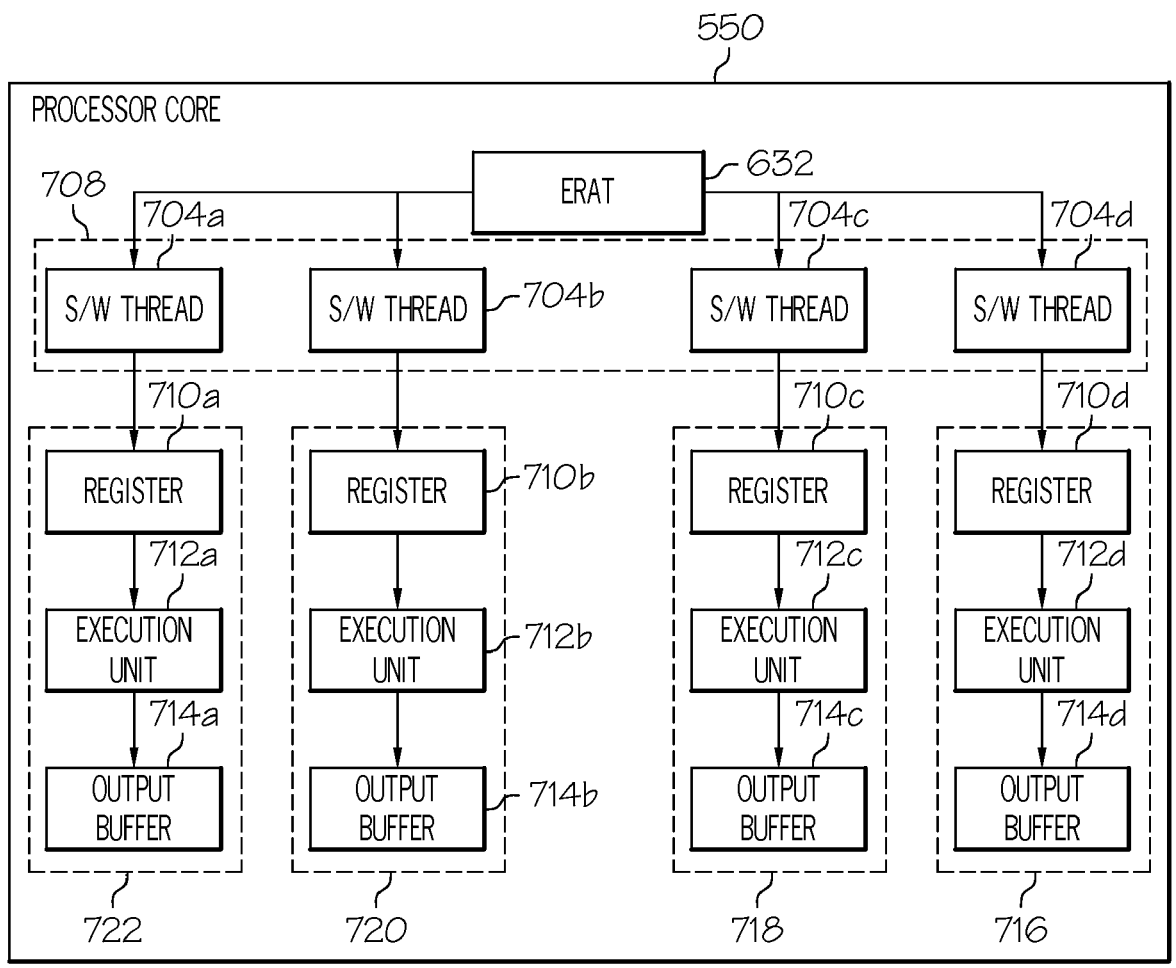
FIG. 7 depicts multiple hardware threads within a single processor core.

Referring now to FIG. 6, additional exemplary detail of core 550, originally presented in FIG. 5, is presented. Core 550 includes an on-chip multi-level cache hierarchy including a unified level two (L2) cache 616 and bifurcated level one (L1) instruction (I) and data (D) caches 618 and 620, respectively. As is well-known to those skilled in the art, caches 616, 618 and 620 provide low latency access to cache lines corresponding to memory locations in system memories (e.g., RAM 306 shown in FIG. 3).

Instructions are fetched for processing from L1 I-cache 618 in response to the effective address (EA) residing in instruction fetch address register (IFAR) 630. During each cycle, a new instruction fetch address may be loaded into IFAR 630 from one of three sources: branch prediction unit (BPU) 636, which provides speculative target path and sequential addresses resulting from the prediction of conditional branch instructions, global completion table (GCT) 638, which provides flush and interrupt addresses, and branch execution unit (BEU) 692, which provides non-speculative addresses resulting from the resolution of predicted conditional branch instructions. Associated with BPU 636 is a branch history table (BHT) 635, in which are recorded the resolutions of conditional branch instructions to aid in the prediction of future branch instructions.

An effective address (EA), such as the instruction fetch address within IFAR 630, is the address of data or an instruction generated by a processor. The EA specifies a segment register and offset information within the segment. To access data (including instructions) in memory, the EA is converted to a real address (RA), through one or more levels of translation, associated with the physical location where the data or instructions are stored.

Within core 550, effective-to-real address translation is performed by memory management units (MMUs) and associated address translation facilities. Preferably, a separate MMU is provided for instruction accesses and data accesses. In FIG. 6, a single MMU 611 is illustrated, for purposes of clarity, showing connections only to Instruction Store Unit (ISU) 601. However, it is understood by those skilled in the art that MMU 611 also preferably includes connections (not shown) to load/store units (LSUs) 696 and 698 and other components necessary for managing memory accesses. MMU 611 includes Data Translation Lookaside Buffer (DTLB) 612 and Instruction Translation Lookaside Buffer (ITLB) 613. Each TLB contains recently referenced page table entries, which are accessed to translate EAs to RAs for data (DTLB 612) or instructions (ITLB 613). Recently referenced EA-to-RA translations from ITLB 613 are cached in EOP effective-to-real address table (ERAT) 632.

If hit/miss logic 622 determines, after translation of the EA contained in IFAR 630 by ERAT 632 and lookup of the real address (RA) in I-cache directory 634, that the cache line of instructions corresponding to the EA in IFAR 630 does not reside in L1 I-cache 618, then hit/miss logic 622 provides the RA to L2 cache 616 as a request address via I-cache request bus 624. Such request addresses may also be generated by prefetch logic within L2 cache 616 based upon recent access patterns. In response to a request address, L2 cache 616 outputs a cache line of instructions, which are loaded into prefetch buffer (PB) 628 and L1 I-cache 618 via I-cache reload bus 626, possibly after passing through optional predecode logic 602.

Once the cache line specified by the EA in IFAR 630 resides in L1 cache 618, L1 I-cache 618 outputs the cache line to both branch prediction unit (BPU) 636 and to instruction fetch buffer (IFB) 640. BPU 636 scans the cache line of instructions for branch instructions and predicts the outcome of conditional branch instructions, if any. Following a branch prediction, BPU 636 furnishes a speculative instruction fetch address to IFAR 630, as discussed above, and passes the prediction to branch instruction queue 664 so that the accuracy of the prediction can be determined when the conditional branch instruction is subsequently resolved by branch execution unit 692.

IFB 640 temporarily buffers the cache line of instructions received from L1 I-cache 618 until the cache line of instructions can be translated by instruction translation unit (ITU) 642. In the illustrated embodiment of core 550, ITU 642 translates instructions from user instruction set architecture (UISA) instructions into a possibly different number of internal ISA (IISA) instructions that are directly executable by the execution units of core 550. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table 638 to an instruction group, the members of which are permitted to be dispatched and executed out-of-order with respect to one another. Global completion table 638 tracks each instruction group for which execution has yet to be completed by at least one associated EA, which is preferably the EA of the oldest instruction in the instruction group.

Following UISA-to-IISA instruction translation, instructions are dispatched to one of latches 644, 646, 648 and 650, possibly out-of-order, based upon instruction type. That is, branch instructions and other condition register (CR) modifying instructions are dispatched to latch 644, fixed-point and load-store instructions are dispatched to either of latches 646 and 648, and floating-point instructions are dispatched to latch 650. Each instruction requiring a rename register for temporarily storing execution results is then assigned one or more rename registers by the appropriate one of CR mapper 652, link and count (LC) register mapper 654, exception register (XER) mapper 656, general-purpose register (GPR) mapper 658, and floating-point register (FPR) mapper 660.

The dispatched instructions are then temporarily placed in an appropriate one of CR issue queue (CRIQ) 662, branch issue queue (BIQ) 664, fixed-point issue queues (FXIQs) 666 and 668, and floating-point issue queues (FPIQs) 670 and 672. From issue queues 662, 664, 666, 668, 670 and 672, instructions can be issued opportunistically to the execution units of processing unit 603 for execution as long as data dependencies and antidependencies are observed. The instructions, however, are maintained in issue queues 662-672 until execution of the instructions is complete and the result data, if any, are written back, in case any of the instructions need to be reissued.

As illustrated, the execution units of core 550 include a CR unit (CRU) 690 for executing CR-modifying instructions, a branch execution unit (BEU) 692 for executing branch instructions, two fixed-point units (FXUs) 694 and 605 for executing fixed-point instructions, two load-store units (LSUs) 696 and 698 for executing load and store instructions, and two floating-point units (FPUs) 606 and 604 for executing floating-point instructions. Each of execution units 690-604 is preferably implemented as an execution pipeline having a number of pipeline stages.

During execution within one of execution units 690-604, an instruction receives operands, if any, from one or more architected and/or rename registers within a register file coupled to the execution unit. When executing CR-modifying or CR-dependent instructions, CRU 690 and BEU 692 access the CR register file 680, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) file 682 contains a count register (CTR), a link register (LR) and rename registers of each, by which BEU 692 may also resolve conditional branches to obtain a path address. General-purpose register files (GPRs) 684 and 686, which are synchronized, duplicate register files and store fixed-point and integer values accessed and produced by FXUs 694 and 605 and LSUs 696 and 698. Floating-point register file (FPR) 688, which like GPRs 684 and 686 may also be implemented as duplicate sets of synchronized registers, contains floating-point values that result from the execution of floating-point instructions by FPUs 606 and 604 and floating-point load instructions by LSUs 696 and 698.

After an execution unit finishes execution of an instruction, the execution notifies GCT 638, which schedules completion of instructions in program order. To complete an instruction executed by one of CRU 690, FXUs 694 and 605 or FPUs 606 and 604, GCT 638 signals the execution unit, which writes back the result data, if any, from the assigned rename register(s) to one or more architected registers within the appropriate register file. The instruction is then removed from the issue queue, and once all instructions within its instruction group have been completed, is removed from GCT 638. Other types of instructions, however, are completed differently.

When BEU 692 resolves a conditional branch instruction and determines the path address of the execution path that should be taken, the path address is compared against the speculative path address predicted by BPU 636. If the path addresses match, no further processing is required. If, however, the calculated path address does not match the predicted path address, BEU 692 supplies the correct path address to IFAR 630. In either event, the branch instruction can then be removed from BIQ 664, and when all other instructions within the same instruction group have completed executing, from GCT 638.

Following execution of a load instruction, the effective address computed by executing the load instruction is translated to a real address by a data ERAT (not illustrated) and then provided to L1 D-cache 620 as a request address. At this point, the load instruction is removed from FXIQ 666 or 668 and placed in load reorder queue (LRQ) 609 until the indicated load is performed. If the request address misses in L1 D-cache 620, the request address is placed in load miss queue (LMQ) 607, from which the requested data is retrieved from L2 cache 616, and failing that, from another core 550 or from system memory (e.g., RAM 528 shown in FIG. 5). LRQ 609 snoops exclusive access requests (e.g., read-with-intent-to-modify), flushes or kills on interconnect fabric (not shown) against loads in flight, and if a hit occurs, cancels and reissues the load instruction. Store instructions are similarly completed utilizing a store queue (STQ) 610 into which effective addresses for stores are loaded following execution of the store instructions. From STQ 610, data can be stored into either or both of L1 D-cache 620 and L2 cache 616.

As noted above, each node (e.g., each of threads 108*a-d*) includes one or more processor cores (e.g., one of the depicted processor core(s) 550 depicted in FIG. 5). Additional detail of an exemplary embodiment of such a processor core 550 is presented FIG. 7. Within processor core 550 is an Effective-to-Real Address Table (ERAT) 632 (shown above in FIG. 6), which is used to dispatch different software threads 704*a-d* from a work unit 708, which may be a user application (e.g., user application 112 shown in FIG. 1) or a work unit message (e.g., packets 110*a-d* shown in FIG. 1). When the work unit 708 is received by the processor core 550, a specific hardware thread 716, made up of a register 710*d*, an execution unit 712*d*, and an output buffer 714*d*, may execute the instructions in the software thread 704*d*. With reference to FIG. 6 above, an exemplary hardware thread may be composed of FPR mapper 660, FPIQ 672, FPR 688 and FPU 604. Another exemplary hardware thread may be composed of GPR mapper 658, FXIQ 668, FXU 605, and GPR 686. These are exemplary hardware threads, as others may be contemplated that include FXU 694, LSU 698, CRU 690, BEU 692, etc.

Referring again to FIG. 7, note that different hardware threads 716, 718, 720, and 722 may independently and/or semi-autonomously execute different software threads from the work unit 708.

Figure 8:
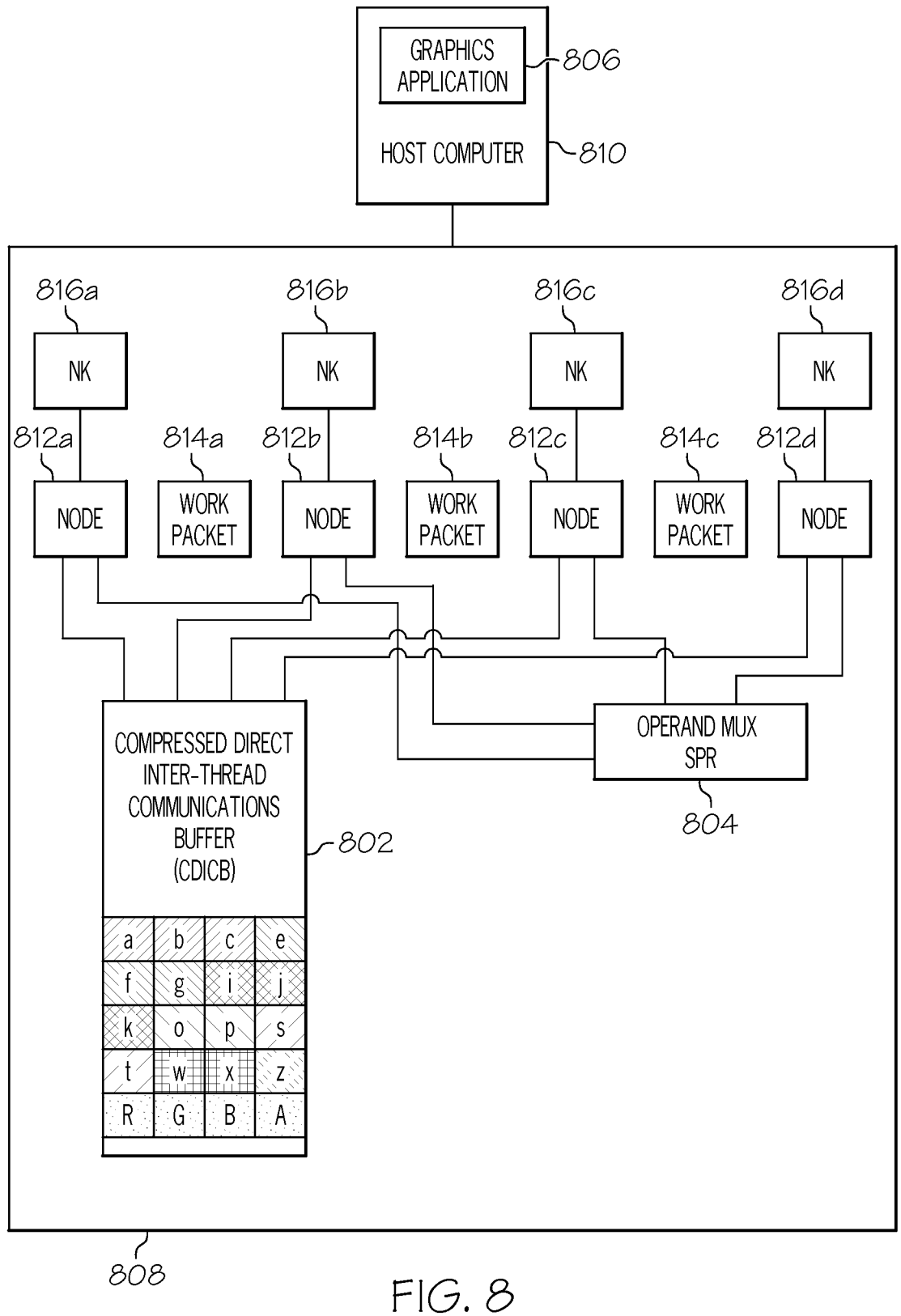
FIG. 8 illustrates an exemplary implementation of an inventive NOC, which utilizes a Compressed Direct Interthread Communications Buffer (CDICB) and an operand multiplexer (MUX) Special Purpose Register (SPR) to provide selected operands to multiple processor nodes in the NOC.
Figure 9:
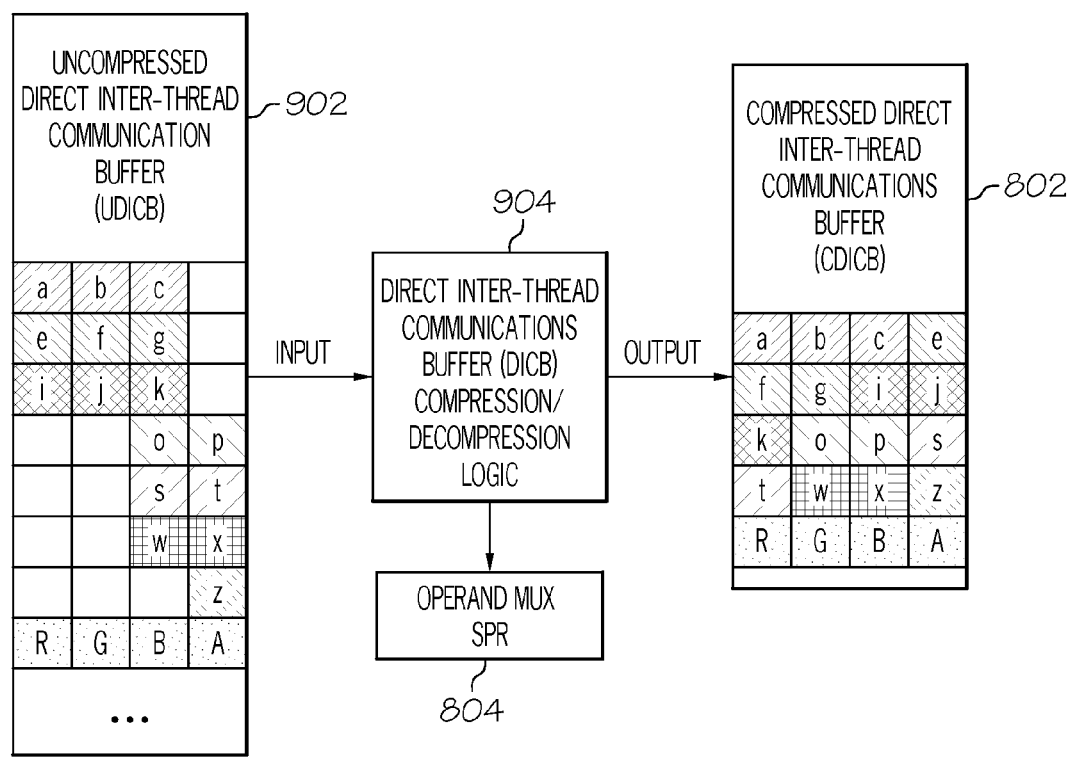
FIG. 9 depicts data from an aligned Uncompressed Direct Inter-thread Communications Buffer (UDICB) being misaligned and compressed by alignment/compression logic in the NOC described in FIGS. 1-8.

With reference now to FIG. 8, consider the following exemplary utilization of a Compressed Direct Inter-thread Communications Buffer 802 and an operand Multiplexer (MUX) Special Purpose Register (SPR) 804 within the context of the present invention. Assume that a graphics application 806 is to be executed within a NOC 808. Graphics application 806, which is dispatched from a host computer 810, is a real time three dimensional (3D) projection and rasterization graphics application that can take advantage of the highly threaded nature of NOC 808 using the Direct Inter-Thread Communication (DITC) afforded by CDICB 802 and MUX SPR 804. More specifically, DITC allows nodes 812*a-d* (each of which is analogous to node 422 depicted in FIG. 4) and/or threads (e.g., threads 108*a-d* depicted in FIG. 1) to be assigned to perform different portions of the graphics workload from graphics application 806. Thus, node 812*a* may be a host interface thread that handles the state of the software pipeline and incoming graphics function calls such as OpenGL glVertex3f( ) calls. Node 812*a* (which includes hardware logic and, optionally, specific software tailored to executing the operations associated with node 812*a*) then begins to fill its DITC outbox buffer (not shown) with data and control information in the form of a NOC work packet 814*a*. Using a process and hardware described in more detail below, this chip packet is initially uncompressed and unaligned, but is compressed and aligned before being transmitted to the next node/thread in the NOC 808. That is, consider the Uncompressed Direct Inter-thread Communication Buffer (UDICB) 902 (analogous to UDICB 206 presented in FIG. 2) shown in FIG. 9. As depicted, UDICB 902 includes data that is used to process Red (R), Green (G), Blue (B), and Alpha Compositing (A—for controlling image transparency) data for a graphics program. However, in a scenario that is analogous to that described above in FIG. 2, the data within the UDICB 902 is unaligned (has "holes" between different aggregates of words such as a-c, e-g, etc.). In order to reduce transmission traffic and wasted space in a buffer, the UDICB 902 is compressed by a Direct Inter-thread Communications Buffer (DICB) compression/decompression logic 904, which is described in more detail below in FIG. 10. This DICBP compression/decompression logic 904 generates the Compressed Direct Inter-thread Communication Buffer (CDICB) 802 that was introduced earlier in FIG. 8. At the same time, corresponding data is generated for and populated into the operand MUX SPR 804. As described below, this corresponding data is MUX control data that is stored within the MUX SPR 804 to control MUXs within nodes for the purpose of re-aligning data stored within the CDICB 802 before being used by a processor within a node, and for misaligning processed operands after they have been used by the processor, in order to maintain the organizational integrity of the CDICB 802.

Note that a different MUX SPR 804 may be stored within each node within the NOC, or a single MUX SPR 804 may be utilized by all nodes within the NOC (as shown). In either scenario, coordination logic (hardware and/or software) may be utilized to ensure that the orientation (i.e., layout of rows) of operands stored within the CDICB 802 remains consistent between original operands stored within the CDICB 802 and processed operands that have been processed by and outputted by nodes within the NOC.

Returning to FIG. 8, the output from host interface thread node 812*a* is packaged into work packet 814*a*, which is sent via a network (not shown) within the NOC 808 to node 812*b*, which receives the work packet 814*a* and performs operations on received packet data such as vertex 3D transforms, projection to 2D, and lighting calculations. Node (thread) 812*b* then populates a work packet 814*b* with resultant data and control information for transmission to node (thread) 812*c*. Node 812*c* performs rasterization operations on the received data, and outputs results to work packet 814*c* for transmission to node 812*d*. Node 812*d* performs the final operation on the job from graphics application 806, which includes texture processing of images to be displayed. This final operation completes the execution of the job presented by graphics application 806, resulting in a final signal (e.g., digital image representation) for generating a display image on a screen (e.g., output device 106 shown above in FIG. 1).

Note that each of the nodes 812*a-d* in the NOC 808 may be associated with a different dedicated nanokernel 816*a-d*. A nanokernel is defined as a thin piece of operating system software logic that is only capable of 1) transmitting work unit messages (e.g., packets 814*a-d*) between nodes 812*a-d*, and 2) managing and controlling access to operands within CDICB 802 through the use of operand control data from MUX SPR 804.

Figure 10:
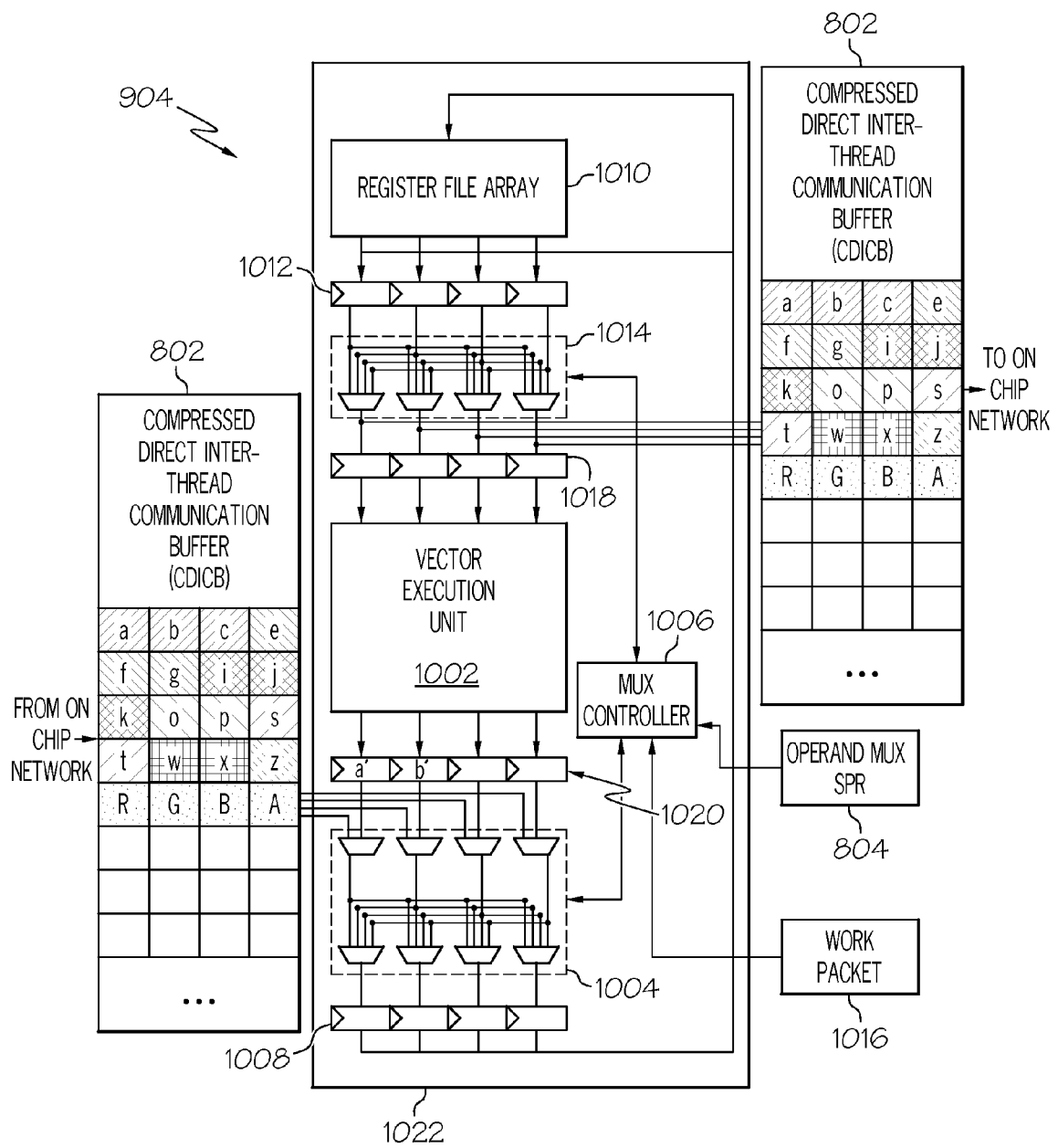
FIG. 10 illustrates logic within a processor node for extracting and aligning data from a Compressed Direct Interthread Communication Buffer (CDICB)

Referring now to FIG. 10, additional detail of the DICB compression/decompression logic 904 is shown within a node 1022 (e.g., one of the nodes 812*a-d* shown in FIG. 8). As described above for each of the nodes 812*a-d* in FIG. 8, node 1022 accesses data words (e.g., operands that are to be supplied to execution logic such as a vector execution unit 1002 within node 1022) from CDICB 802. Note that it is assumed that CDICB 802 has been misaligned/compressed from a properly aligned uncompressed buffer (e.g., UDICB 902 shown in FIG. 9). Such misalignment/compression may be performed using either hardware alone (not shown), or software controlled processes as now described in FIG. 10.

Initially, operands from CDICB 802 are inputted into a first set of MUXs 1004. The first set of MUXs 1004 control the re-alignment of operands received from CDICB 802 using control lines (not shown) that are attached to the first set of MUXs 1004. These control lines are under the control of a MUX controller 1006, which utilizes control data from MUX SPR 804. This control data was created when CDICB 802 was misaligned/compressed from UDICB 902 in a manner describe above. That is, the MUX control data within MUX SPR 804 enables the "unpacking" of the operands from CDICB 802 in a manner that results in such operands being realigned as they were in the original UDICB 902 shown in FIG. 9. This realigned format of operands (including blank blocks) are now in a format that can be understood and processed by the vector execution unit 1002, which in the example described herein, reads four-word rows of data at each read cycle.

The realigned rows of operands are stored in buffer 1008, and then stored in a register file array 1010. From the register file array 1010, the realigned rows of operands are stored in buffer 1012, from which specific operands are selectively read by a second set of MUXs 1014 that are also under the control of MUX controller 1006, MUX SPR 804, and/or information in a work packet 1016 (e.g., one of the packets 110*a-d* shown in FIG. 1 or work packets 814*a-d* shown in FIG. 8). For example, assume that a work packet 1016 "knows" that it needs only operands a and b. This "knowledge" is passed on to MUX controller 1006, which, with the alignment information provided by MUX SPR 804 is able to control the second set of MUXs 1014 such that only operands a and b reach a buffer 1018 for the vector execution unit 1002. Vector execution unit 1002 (which contains multiple parallel execution units or hardware threads, such as those shown in FIG. 7) then processes operands a and b, and outputs the processed operands a' and b' to buffers 1020. Process operands a' and b' then pass through the system again until they are extracted by the second set of MUXs 1014 and inserted into the appropriate storage cells in the CDICB 802. Note that processed operands a' and b' occupy the same cells in CDICB 802 as the original (pre-processed) operands a and b.

In one embodiment, a third set of MUXs (not shown) are aligned and configured in a substantially similar manner as that shown for the first set of MUXs 1004. If a first and second set of MUXs are provided, then the first set of MUXs can be dedicated to processing a first row of data from the CDICB 802 while the third set of MUXs is dedicated to processing a second (next) row of data from the CDICB 802. Similarly, additional sets of MUXs can be used to augment the second set of MUXs 1014 such that different rows of operands can be simultaneously handled in a manner described above with the two single sets of MUXs.

Note that the term "compressed" as used herein describes data words that are stored in a buffer or packet such that there are no empty cells in a buffer, as discussed and illustrated above. The term "compressed" is not to be used herein to describe or define data compression in which information is encoding using an encoding algorithm, thus resulting in fewer bits to represent original uncompressed data.

Figure 11:
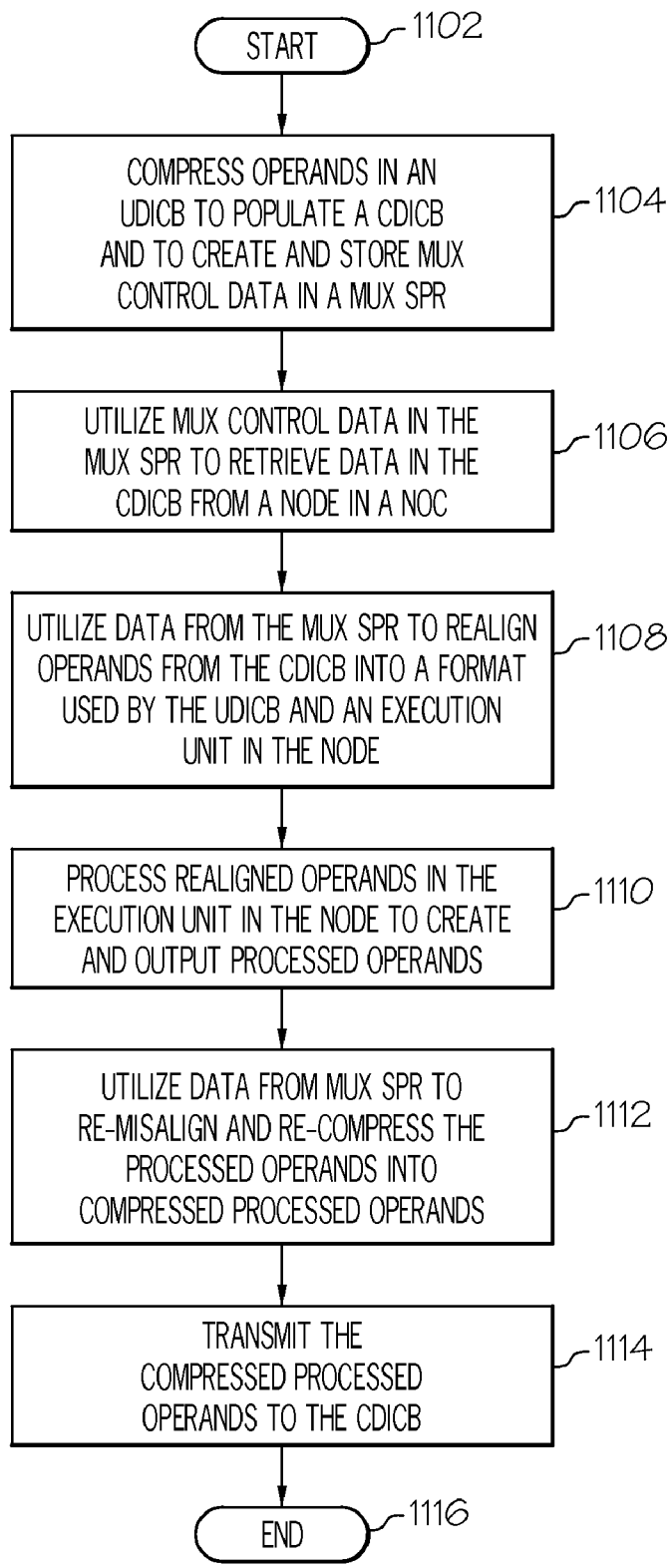
FIG. 11 is a high level flow chart of exemplary steps taken by the present invention to align, utilize and re-misalign operands that a processor node has retrieved from a CDICB.

With reference now to FIG. 11, a high-level flow chart of exemplary steps taken to retrieve and re-align misaligned operands from a Compressed Direct Inter-thread Communication Buffer (CDICB) is presented. After initiator block 1102, operands found in an Uncompressed Direct Inter-thread Communication Buffer (UDICB) are compressed (misaligned) and stored in this misaligned orientation within a Compressed Direct Inter-thread Communication Buffer (CDICB). At the time of this compression/misalignment, multiplexer (MUX) control data is stored in a MUX Special Purpose Register (SPR), as described in block 1104. This MUX control data will be used in a later step to re-align the operands for use by an execution unit in a node in a Network On a Chip (NOC).

As described in block 1106, operands are retrieved from the CDICB by a node in the NOC using MUX control data from the MUX SPR, using a process described above in FIG. 10. Alignment data from the MUX SPR is then used to realign operands from the CDICB into the same alignment found in the UDICB (block 1108). This realigned organization is required by a vector execution unit in the node, which may need to read operands in a particular order/orientation, in order to supply the appropriate operand to an appropriate execution unit within the vector execution unit.

After the execution units within the vector execution unit process selected operands (block 1110), the MUX SPR provides control information to the MUX controller to re-misalign and re-compress the processed operands (block 1112) for transmission to and storage in the CDICB (block 1114). Assuming that no other operands are needed from the CDICB, the process ends at terminator block 1116.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

What is claimed is:

1. A Network On a Chip (NOC), the NOC comprising:
a first processing node in the NOC, wherein the NOC comprises multiple processing nodes, multiple routers, multiple communication controllers, and multiple network interface controllers, wherein each of the multiple processing nodes is coupled to one of the multiple routers through a dedicated memory communications controller from the multiple communication controllers, wherein each of the multiple communication controllers controls communications between the multiple processing nodes and an off-chip memory, and wherein each of the multiple network interface controllers controls inter-processing node communications through the multiple routers;
at least one execution unit within the first processing node;
a Compressed Direct Inter-thread Communications Buffer (CDICB) coupled to the processing node, wherein the CDICB is populated with operands from an Uncompressed Direct Inter-thread Communication Buffer (UDICB) that comprises at least one empty buffer cell between at least two operands that are stored in the UDICB, and wherein the UDICB and the CDICB contain multiple different operand aggregates;
a multiplexer (MUX) Special Purpose Register (SPR) coupled to the CDICB and the first processing node, wherein the MUX SPR stores MUX control data; and
a MUX controller coupled to the MUX SPR and a first set of MUXs within the first processing node, wherein the MUX controller utilizes the MUX control data from the MUX SPR and the first set of MUXs to realign original operands retrieved from the CDICB by the first processing node, wherein the realigned original operands are organized by data rows in an organization format that is required by an execution unit architecture for supplying operands to said at least one execution unit.

2. The NOC of claim 1, wherein said at least one execution unit processes realigned operands to generate processed operands, the NOC further comprising:
a second set of MUXs coupled to the MUX controller, wherein the second set of MUXs re-misaligns and re-compresses the processed operands for transmission to and storage within the CDICB.

3. The NOC of claim 1, wherein the CDICB maintains a same organizational alignment for the original operands and corresponding processed operands.

4. The NOC of claim 1, wherein each processing node in the NOC is associated with a different dedicated nanokernel, and wherein each dedicated nanokernel is a thin piece of operating system software logic that 1)transmits work unit messages between the multiple processing nodes in the NOC, and 2)manages and controls access to the operands within the CDICB through a use of the MUX control data from the MUX SPR.

5. The NOC of claim 1, wherein said at least one execution unit is a vector processor.

6. The NOC of claim 1, further comprising:
a host computer that is coupled to the NOC, wherein the host computer delegates instructions for a user application to the multiple processing nodes within the NOC.

7. The NOC of claim 6, wherein the UDICB contains data that is used by a real time three-dimensional projection software application, and wherein a second node within the NOC is dedicated to performing three-dimensional transforms, projections and lighting calculations for images created by the real time three-dimensional projection software application.

8. The NOC of claim 7, further comprising:
a third node, wherein the third node is dedicated to rasterizing the images created by the real time three-dimensional projection software application.

9. The NOC of claim 8, further comprising:
a fourth node, wherein the fourth node is dedicated to texture processing the images created by the real time three-dimensional projection software application.

10. The NOC of claim 1, further comprising:
a third set of MUXs, wherein the first set of MUXs processes a first row of operands from the CDICB, and wherein the third set of MUXs processes a next row of operands from the CDICB.

11. A computer-implemented method of controlling arbitrary operand selection from a Compressed Direct Inter-thread Communication Buffer (CDICB) in a Network On a Chip (NOC), the method comprising:
converting an alignment of operands in an Uncompressed Direct Inter-thread Communication Buffer (UDICB) into a misalignment of operands in the Compressed Direct Inter-thread Communication Buffer (CDICB), wherein the UDICB comprises at least one empty buffer cell between at least two operands that are stored in the UDICB, and wherein the CDICB comprises no empty buffer cells between any two operands that are stored in the CDICB;
storing multiplexer (MUX) control data in a MUX Special Purpose Register (SPR) within the NOC, wherein the NOC comprises multiple processing nodes, multiple routers, multiple communication controllers, and multiple network interface controllers, wherein each of multiple processing nodes is coupled to one of the multiple routers through a dedicated memory communications controller from the multiple communication controllers, wherein each of the multiple communication controllers controls communications between the multiple processing nodes and an off-chip memory, wherein each of the multiple network interface controllers controls inter-processing node communications through the multiple routers, and wherein the MUX control data is generated during the converting of the organization of operands in the UDICB; and
retrieving operands from the CDICB at a processing node in the NOC, wherein the operands are selectively retrieved by utilizing the MUX control data from the MUX SPR to control a first set of MUXs in the processing node, and wherein the first set of MUXs selectively reads specific operands from the CDICB.

12. The computer-implemented method of claim 11, further comprising:
utilizing the MUX control data to realign the operands from the CDICB into an alignment format that is required by an execution unit in the processing node; and
processing the realigned operands in the processing node to create and output processed operands.

13. The computer-implemented method of claim 12, further comprising:
utilizing the MUX control data to re-misalign and re-compress the output processed operands into compressed processed operands.

14. The computer-implemented method of claim 13, further comprising:
transmitting the compressed processed operands to the CDICB; and
storing the compressed processed operands in a same misalignment as original operands in the CDICB.

15. The computer-implemented method of claim 11, wherein the step of retrieving the operands is under a control of a MUX controller, wherein the MUX controller retrieves the operands from the CDICB through a use of 1) the MUX control data and 2) control data from a work packet that is transmitted to the processing node.

16. The computer-implemented method of claim 11, wherein each processing node in the NOC is associated with a different dedicated nanokernel, and wherein each dedicated nanokernel is a thin piece of operating system software logic that 1) transmits work unit messages between the multiple processing nodes in the NOC, and 2) manages and controls access to the operands within the CDICB through a use of the MUX control data from the MUX SPR.

17. A non-transitory computer-readable storage medium on which is encoded a computer program, the computer program comprising computer executable instructions configured for:
converting an alignment of operands in an Uncompressed Direct Inter-thread Communication Buffer (UDICB) into a misalignment of operands in a Compressed Direct inter- thread Communication Buffer (CDICB), wherein the UDICB comprises at least one empty buffer cell between at least two operands that are stored in the UDICB, and wherein the CDICB comprises no empty buffer cells between any two operands that are stored in the CDICB;
storing multiplexer (MUX) control data in a MUX Special Purpose Register (SPR) within a Network On a Chip (NOC), wherein the NOC comprises multiple processing nodes, multiple routers, multiple communication controllers, and multiple network interface controllers, wherein each of the multiple processing nodes is coupled to one of the multiple routers through a dedicated memory communications controller from the multiple communication controllers, wherein each of the multiple memory communications controllers controls communications between the multiple processing nodes and an off-chip memory, wherein each of the multiple network interface controllers controls inter-processing node communications through the multiple routers, and wherein the MUX control data is generated during the converting of an organization of the operands in the UDICB; and retrieving the operands from the CDICB at a processing node in the NOC, wherein the operands from the CDICB are selectively retrieved by utilizing the MUX control data from the MUX SPR to control a first set of MUXs in the processing node, and wherein the first set of MUXs selectively reads specific operands from the CDICB.

18. The non-transitory computer-readable storage medium of claim 17, wherein the computer executable instructions are further configured for:

utilizing the MUX control data to realign the operands from the CDICB into an alignment format that is required by an execution unit in the processing node; and processing the realigned operands in the processing node to create and output processed operands.

19. The non-transitory computer-readable storage medium of claim 18, wherein the computer executable instructions are further configured for:

utilizing the MUX control data to re-misalign and re-compress the output processed operands into compressed processed operands.

20. The non-transitory computer-readable storage medium of claim 19, wherein the computer executable instructions are further configured for:

transmitting the compressed processed operands to the CDICB; and storing the compressed processed operands in a same misalignment as original operands from the UDICB.

* * * * *